May 10, 1966 W. J. COLE 3,250,999
DUAL SQUELCH
Filed Oct. 16, 1962
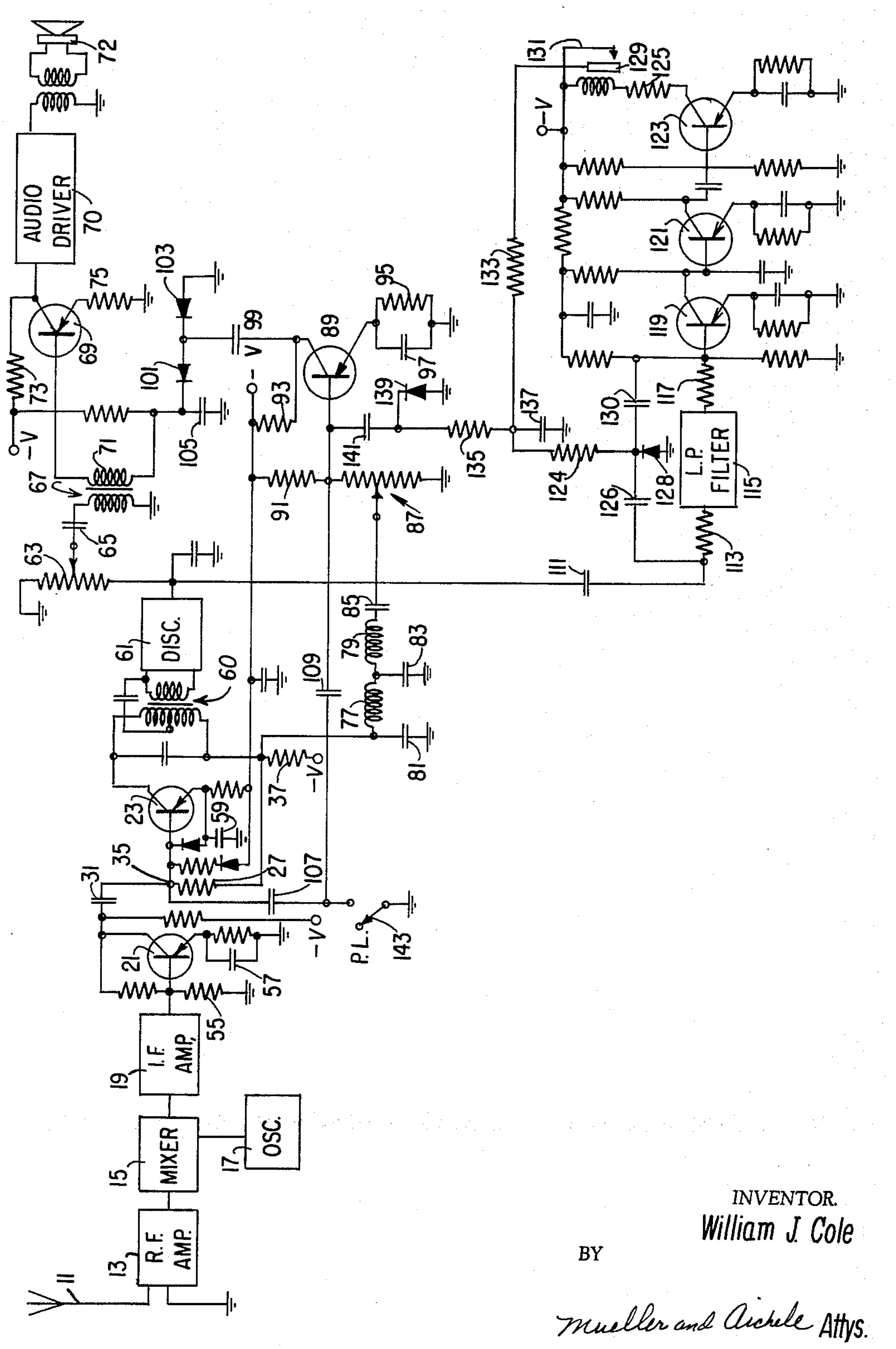
INVENTOR.
William J. Cole
BY
Mueller and Aichele Attys.

United States Patent Office 3,250,999
Patented May 10, 1966

3,250,999
DUAL SQUELCH

William J. Cole, Chicago, Ill., assignor to Motorola, Inc., Chicago, Ill., a corporation of Illinois Filed Oct. 16, 1962, Ser. No. 230,881
9 Claims. (Cl. 325—348)

This invention relates to radio communication equipment, and more particularly to a radio receiver having provision for dual squelch operation.

It has been found essential in high gain communication receivers to provide a squelch system for cutting off the audio output of the receiver in the absence of a carrier wave modulated by a signal to be received. Receiver squelch systems have also been used wherein the audio output is normally cut off and is actuated by a coded tone signal impressed on the carrier wave. It is also known to incorporate both types of squelch systems in the same receiver to permit operation either in a selective or coded tone operated network or as a channel monitor responsive to all signals of the tuned frequency. For use as a channel monitor in the noise squelch mode, the receiver accepts all on-frequency signals of usable signal strength and passes them on to the speaker. Normal use of such a receiver would involve switching to the noise squelch mode for a brief period before transmitting to be sure of a clear channel.

It is, of course, desirable that such dual squelch receivers be simple and low in cost and yet provide highly reliable operation. As a result, a dilemma is presented in that to provide simple circuitry often results in reduced sensitivity in the selective mode at high tight settings of the noise squelch control. The elimination of this particular drawback often necessitates the addition of complex switch systems for completely bypassing the squelch control.

It is an object of the present invention to provide a simple, low cost, and highly reliable dual squelch system for a radio receiver.

Another object of the invention is to provide a squelch system for combined noise squelch and tone squelch operation having a simple switch arrangement for opening the squelch operating in the tone squelch mode.

A further object of this invention is to provide a dual squelch system for a radio receiver which enables the receiver, when operating in the noise squelch mode, to open its squelch when receiving a coded carrier signal of low strength, even though its noise squelch control is set for high tight squelch conditions.

A feature of the invention is the provision, in a squelch circuit for a radio receiver, of a diode switch adapted to be forward biased by a tone responsive circuit to shunt current from the squelch amplifier upon receipt of a coded tone signal to allow the squelch circuit to open.

Another feature of the invention is the provision, in a radio receiver, of a dual squelch system wherein the squelch is activated by both detected noise signals and constant intermediate frequency signals, and including a manual switch for short circuiting the intermediate frequency signals from the squelch amplifier to allow noise squelch operation.

The drawing is a schematic diagram of a radio receiver constructed in accordance with the invention.

According to the present invention, a radio receiver is provided with a squelch amplifier for biasing an audio amplifier to cutoff. Current is provided to the squelch amplifier from the amplitude limiter stage of the receiver and consists of two signals, detected noise and intermediate frequency carrier. When either of the two signals is present the receiver will be effectively squelched. A diode switch is connected to the squelch amplifier and may be closed for shunting the current applied thereto to ground and thereby opening the squelch. This diode switch is controlled by a frequency responsive unit which, upon receipt of a coded tone signal, applies forward bias to the diode switch to render the same conducting and shunt the input to the squelch amplifier. Noise squelch operation is provided by operation of a manual switch which short circuits the intermediate frequency signals to divert the same from the squelch amplifier. When this is done the squelch amplifier will operate only in response to detected noise signals, thus operating as an all-channel noise squelch system. During such operation, and with noise present, the squelch will still open upon receipt of the proper coded tone signal.

Referring now to the drawing, there is depicted a radio receiver having an antenna 11 for coupling received radio frequency signals to a radio frequency amplifier 13. The output of amplifier 13 is applied to mixer 15, where it is heterodyned with signals from local oscillator 17 to provide intermediate frequency signals which are then applied to intermediate frequency amplifier 19. Signals from intermediate frequency amplifier 19 are applied to an amplitude limiter circuit including transistors 21 and 23. The intermediate frequency output of amplifier 19 appears across resistor 55 and drives transistor 21, which has its emitter electrode connected through capacitor 57 to ground. Transistor 21 limits the amplitude of the intermediate frequency signals, and its output is applied through capacitor 31 to resistor 27. This limited signal appearing at point 35 drives transistor 23. Transistor 23 has its emitter electrode connected to ground through capacitor 59. The intermediate frequency signal at point 35 may also include noise centered around the intermediate frequency. Current for transistor 21 is provided from a source of negative potential and current for transistor 23 is provided through decoupling resistor 37.

The ouput of transistor 23 is applied through transformer 60 to discriminator 61. Discriminator 61 provides audio output signals which are applied through volume control 63, capacitor 65 and transformer 67 to an audio amplifier stage 69. Bias is provided for transistor 69 through resistors 71 and 73, and the emitter electrode of transistor 69 is connected to ground through resistor 75. Amplified audio signals will appear at the collector electrode of transistor 69. These are passed on to drive amplifier 70 which drives a speaker 72.

Squelch action is provided by taking the detected noise signals appearing across decoupling resistor 37 and passing them through a low pass filter network including chokes 77 and 79 and capacitors 81, 83 and 85. Low frequency noise from the filter network is passed through adjustable squelch control 87 to the base circuit of the squelch amplifier transistor 89. Bias for squelch amplifier 89 is provided through resistors 91 and 93, and the emitter of squelch amplifier 89 is connected to ground through the parallel combination of resistor 95 and capacitor 97. The output of squelch amplifier 89 is coupled through capacitor 99 to a voltage doubler network comprised of diodes 101 and 103, and capacitor 105. This rectified voltage is applied to the base electrode of transistor 69 to cut off the audio output thereof.

In addition to the noise appearing across resistor 37, the intermediate frequency signal at point 35, which is of substantially constant amplitude is coupled through capacitor 107 and capacitor 109 to the base circuit of squelch amplifier 89. This signal is also amplified by squelch amplifier 89 and applied through the voltage doubler network to the base of transistor 69 to bias the same to cutoff. It will be apparent, therefore, that either noise signals detected across resistor 37, or intermediate frequency signals at point 35, will cause the squelch amplifier to squelch the audio.

A portion of the output of discriminator 61 is applied through capacitor 111 and resistor 113 to a low pass filter 115. The low frequency output of filter 115 is applied through resistor 117 to successive stages of a selective amplifier unit. These include grounded emitter transistor stages 119, 121 and 123 with associated bias networks. The output of transistor 123 is applied through resistor 125 to the driving coil 127 of a frequency selective reed unit which may be of the type disclosed in Patent No. 2,688,059 issued to Robert Peth, and assigned to the assignee of the present invention. As is known in such devices, the reed 129 will vibrate in response to signals of the resonant frequency of the reed appearing in driving coil 127. Thus the frequency selective unit will be responsive only to a given frequency.

Upon receipt of a signal of the coded frequency by the receiver, the tone signal is taken from the discriminator and filtered out from the audio by filter 115. The coded tone signal is then amplified, and applied to coil 127 causing reed 129 to vibrate and close the contact 131. This sends voltage through a filter network including resistors 133 and 135 and capacitor 137 to a diode 139. The bias voltage from the selective signalling unit thus forward biases diode 139, to render the same conductive. Diode 139 is coupled to the base of transistor 89 through capacitor 141. When diode 139 conducts its grounds capacitor 141 to provide a shunt path for signals applied to the base of transistor 89. Accordingly, there is no input signal to transistor 89 and no output signal from squelch amplifier 89 to the voltage doubler. This allows audio amplifier stage 69 to become forward biased and the receiver becomes unsquelched.

A switch 143, which may be manually operated from without the receiver, is connected to short the juncture between capacitors 107 and 109 to ground. When switch 143 is closed, the receiver will operate in the noise squelch mode, monitoring all signals of the frequency to which the receiver is tuned. During such operation, the appearance of noise signals at the decoupling resistor 37 will cause the squelch to cut off the audio. It will be apparent that when operating in this mode, the presence of a coded tone will still cause the receiver to be unsquelched no matter where squelch control 87 is set. That is, if a coded signal is received, it will be amplified in transistors 119, 121 and 123 and applied to coil 127. If the coded signal is of the resonant frequency of reed 129, diode switch 139 will close to shunt the input to squelch amplifier 89 and open the squelch. When operating in the tone squelch mode, the presence of intermediate frequency signals at point 35 will cause the squelch system to constantly bias the audio amplifier 69 to cutoff. In the absence of a carrier signal, the presence of noise signals will actuate the squelch. This bias will be removed only when the proper coded tone is received by the selective signalling unit to close diode switch 139 and shunt the input to squelch amplifier 89.

During periods when a tone signal is not received, series capacitors 126 and 130 bypass high frequency noise around filter 115 to the base of transistor 119. Due to limiting action of transistor 123, the amplitude of this noise is sufficient to override the low frequency noise passed by filter 115, preventing this latter noise from falsely closing contact 131. Upon receipt of a coded signal, contact 131 will close forward biasing diode 128 through resistor 124, to short the bypass circuit. The system will therefore be more fully responsive to the tone signals once the reed 129 begins to vibrate.

The circuit provides squelching action by selectively amplifying and rectifying either noise or constant level intermediate frequency signals. Closure of contact 131 of the frequency selective unit closes diode switch 139 in the circuit, thereby short circuiting the noise or intermediate frequency signals applied to the squelch amplifier. It may therefore be seen that the invention provides a simple low cost circuit for achieving dual squelch operation while not comprising reliability. This circuit further enables a receiver operating in noise squelch mode to open its squelch for weak coded tone signals on the carrier, even though its noise squelch control is set for high, tight squelch conditions. Finally, the circuit provides a simple method of permitting noise squelch operation of the receiver.

I claim:

1. In a frequency modulation radio receiver having a circuit portion providing intermediate frequency signals, a dual squelch system including in combination, a squelch circuit actuable to squelch the output of the radio receiver, first conductor means connected to said squelch circuit for applying detected noise signals thereto for actuating said squelch circuit, second conductor means for connecting the receiver circuit portion to said squelch circuit for applying intermediate frequency signals thereto for actuating said squelch circuit, means responsive to a given coded signal connected to said squelch circuit to shunt current therefrom for de-actuating said squelch circuit, and second switch means connected to short circuit said second conductor means to prevent passage of intermediate frequency signals to said squelch circuit, whereby said switch means enables selective operation of said receiver in tone squelch and noise squelch modes.

2. In a frequency modulation radio receiver having an amplitude limiter circuit providing intermediate frequency signals, a dual squelch system including in combination, a squelch circuit actuable to squelch the output of the radio receiver, first conductor means connected to said squelch circuit for providing detected noise signals to actuate said squelch circuit, second conductor means for connecting the amplitude limiter circuit to said squelch conduit to conduct the intermediate frequency signals thereto for actuating said squelch circuit, a diode switch connecting said squelch circuit to ground for shunting detected noise signals and intermediate frequency signals therefrom, means responsive to a given coded signal connected to said diode switch to provide a voltage thereto for forward biasing the same causing said diode switch to shunt signals from said squelch circuit for unsquelching the receiver, and a manual switch connected to said second conductor means to short circuit the same so that only detected noise signals will be applied to said squelch circuit, whereby said switch means enables selective operation of said receiver in tone squelch modes.

3. In a frequency modulation radio receiver having an amplitude limiter circuit providing intermediate frequency signals, a dual squelch circuit including in combination, an audio amplifier providing amplified audio signals for the output of the radio receiver, a squelch amplifier connected to said audio amplifier for biasing the same to cutoff, first conductor means connected to said squelch amplifier providing detected noise signals thereto for amplification, second conductor means for connecting the amplitude limited circuit to said squelch amplifier to conduct intermediate frequency signals thereto for amplification, a diode switch connected to shunt both said first and second conductor means to ground, means responsive to a given coded signal connected to said diode switch and providing a voltage thereto for forward biasing said diode switch to shunt current from said first and second conductor means and remove input to said squelch amplifier, and switch means connecting said second conductor means to ground and operable manually to short circuit intermediate frequency signals from said second conductor means so that said squelch amplifier will amplify only detected noise signals applied thereto, whereby said switch means enables selective operation of said receiver in tone squelch and noise squelch modes.

4. A frequency modulation radio receiver having provision for dual squelch operation alternatively permitting operation in noise squelch mode or tone squelch mode, including in combination, amplitude limiter means, discriminator means coupled to the output of said amplitude limiter means, audio amplifier means coupled to the output of said discriminator means for amplifying audio signals derived therefrom, a squelch amplifier connected to said audio amplifier means for biasing the same to cutoff, said amplitude limiter means having means therein providing detected noise signals and intermediate frequency signals, conductor means connecting said limiter to said squelch amplifier for supplying detected noise signals and intermediate frequency signals thereto for amplification, a diode switch connecting said conductor means to ground for shunting current from said squelch amplifier, a D.C. voltage source, first switch means coupled to the output of said discriminator and responsive to a coded signal supplied therefrom, said first switch means connecting said voltage source to said diode switch for applying forward bias thereto to shunt the current in said conductor means from said squelch amplifier, and second switch means connected to short circuit the intermediate frequency signals supplied by said conductor means to said squelch amplifier so that said squelch amplifier will amplify only detected noise signals applied thereto.

5. A frequency modulation radio receiver having provision for dual squelch operation alternatively permitting operation in noise squelch mode or tone squelch mode, including in combination, an amplitude limiter, a discriminator coupled to the output of said amplitude limiter, an audio amplifier coupled to the output of said discriminator for amplifying audio signals supplied thereby, a squelch amplifier connected to said audio amplifier for biasing the same to cutoff, said amplitude limiter having a first conductor therein carrying intermediate frequency signals and a second conductor therein carrying detected noise signals, a first circuit connecting said first conductor to said squelch amplifier to provide signals thereto for amplification, a second circuit connecting said second conductor to said squelch amplifier for supplying current thereto for amplification, a diode switch connecting said first and second circuits to ground for shunting current therefrom, a D.C. voltage source, switch means coupled to the output of said discriminator and responsive to a coded signal supplied therefrom, said switch means connecting said voltage source to said diode switch for forward biasing the same to shunt the current in said first and second circuits from said squelch amplifier, and a manual switch connecting said first circuit to ground so that said squelch amplifier amplifies only detected noise signals supplied thereto by said second circuit, whereby said switch means enables selective operation of said receiver in noise squelch or tone squelch modes.

6. A radio receiver adapted for use in a selective signalling network, including in combination, squelch amplifier means for amplifying detected signals to squelch the output of the radio receiver, said squelch amplifier means having a conductor therein carrying the detected signals which are amplified by said squelch amplifier means, switch means connected to said conductor of said squelch amplifier means to shunt current from said squelch amplifier means, and means responsive to a given coded signal connected to said switch means to provide actuating voltage thereto for closing said switch means to unsquelch the receiver.

7. A frequency modulation radio receiver adapted for use in a selective signalling network, including in combination, a squelch amplifier for amplifying detected signals to squelch the output of the radio receiver, said squelch amplifier having a conductor therein carrying detected noise signals which are amplified by said squelch amplifier, a diode switch connecting said conductor of said squelch means to ground, and a selective signalling circuit responsive to the reception of a given coded signal and connected to said diode switch to apply forward bias thereto for shunting noise signals from said squelch amplifier and unsquelching the receiver.

8. A dual squelch circuit for a frequency modulation radio receiver having an amplitude limiter circuit providing intermediate frequency signals, said dual squelch circuit including in combination, an audio amplifier providing amplified audio signals for the output of the radio receiver, a squelch amplifier connected to said audio amplifier for biasing the same to a condition of non-conduction, conductor means connected to said squelch amplifier and including a first portion applying detected noise signals thereto and a second portion applying intermediate frequency signals thereto, with such signals being amplified by said squelch amplifier, said conductor means further including a third portion for carrying both detected noise signals and intermediate frequency signals for application to said audio amplifier, a diode switch coupled to said third portion of said conductor means to shunt signals therefrom to ground, means responsive to a given received tone signal connected to said diode switch and providing voltage thereto for forward biasing said diode switch to shunt signals from said third portion of said conductor means and unsquelch the receiver, and mechanical switch means connected to said second portion of said conductor means and operable manually to disable said second portion of said conductor means so that said squelch amplifier will amplify only detected noise signals applied thereto, whereby said switch means enables selective operation of the receiver in tone squelch and noise squelch modes.

9. In a frequency modulation radio receiver having a circuit portion providing intermediate frequency signals and an audio amplifier, a dual squelch system including in combination, squelch means connected to the audio amplifier and applying a cutoff bias thereto in response to signals applied to said squelch means, first conductor means connected to said squelch means for applying detected noise signals thereto, second conductor means for connecting the receiver circuit portion to said squelch means for applying intermediate frequency signals thereto, said squelch means including means responsive to a given coded signal for applying a bias voltage to said squelch means to remove cutoff bias from the audio amplifier and unsquelch the receiver, and a switch connected to said second conductor means and manually operable to disable the same and prevent passage of intermediate frequency signals to said squelch means, whereby said switch enables selective operation of said receiver in tone squelch and noise squelch modes.

References Cited by the Examiner

UNITED STATES PATENTS

| | | | |
|---|---|---|---|
| 2,678,384 | 5/1954 | Beers | 325—348 |
| 2,743,361 | 4/1956 | Bauman | 325—466 |
| 2,918,571 | 12/1959 | Peth | 325—478 X |
| 3,027,455 | 3/1962 | Kelly et al. | 325—478 X |
| 3,049,710 | 8/1962 | Buesing et al. | 325—478 X |

ROBERT H. ROSE, *Primary Examiner.*

R. E. ROTELLA, R. S. BELL, *Assistant Examiners.*